US011444427B2

(12) United States Patent
Xiang et al.

(10) Patent No.: US 11,444,427 B2
(45) Date of Patent: Sep. 13, 2022

(54) ELECTRICALLY TUNABLE LASER WITH CHOLESTERIC LIQUID CRYSTAL HELICONICAL STRUCTURE

(71) Applicant: Kent State University, Kent, OH (US)

(72) Inventors: Jie Xiang, Kent, OH (US); Andrii Varanytsia, Kent, OH (US); Fred Minkowski, Kent, OH (US); Oleg D. Lavrentovich, Kent, OH (US); Peter Palffy-Muhoray, Kent, OH (US); Corrie T. Imrie, Aberdeen (GB); Daniel E. Paterson, Aberdeen (GB); John M. Storey, Aberdeen (GB)

(73) Assignees: Kent State University, Kent, OH (US); The University Court of the University of Aberdeen, Aberdeen (GB)

( * ) Notice: Subject to any disclaimer, the term of this patent is extended or adjusted under 35 U.S.C. 154(b) by 323 days.

(21) Appl. No.: 15/776,312

(22) PCT Filed: Nov. 15, 2016

(86) PCT No.: PCT/US2016/062011
§ 371 (c)(1),
(2) Date: May 15, 2018

(87) PCT Pub. No.: WO2017/087374
PCT Pub. Date: May 26, 2017

(65) Prior Publication Data
US 2018/0323570 A1    Nov. 8, 2018

Related U.S. Application Data

(60) Provisional application No. 62/255,735, filed on Nov. 16, 2015.

(51) Int. Cl.
*G02F 1/13*     (2006.01)
*H01S 3/131*    (2006.01)
(Continued)

(52) U.S. Cl.
CPC .............. *H01S 3/131* (2013.01); *C09K 19/36* (2013.01); *C09K 19/586* (2013.01);
(Continued)

(58) Field of Classification Search
CPC .................... G02F 1/13718; G02F 2202/04
See application file for complete search history.

(56) References Cited

U.S. PATENT DOCUMENTS 3,771,065 A * 11/1973 Goldberg ................ H01S 3/213
                                                            372/53
4,606,613 A *  8/1986 Urabe ..................... C09K 19/60
                                                            349/165
(Continued)

FOREIGN PATENT DOCUMENTS

JP          61-209289      *  9/1986  ............... G02F 1/13
WO     WO 2010/057549 A1    5/2010

OTHER PUBLICATIONS

Xiang et al., Electrooptics of chiral nematics formed by molecular dimers, Oct. 7, 2014, SPIE vol. 9182 (Year: 2014).*
(Continued)

*Primary Examiner* — Paisley L Wilson
(74) *Attorney, Agent, or Firm* — Fay Sharpe LLP

(57) ABSTRACT

A lasing device includes an active layer comprising a cholesteric liquid crystal material and a laser dye, and a liquid crystal cell including spaced apart substrates defining a cell gap in which the active layer is disposed. The substrates include electrodes arranged to bias the active layer into an oblique helicoidal ($Ch_{OH}$) state. At least one
(Continued)

substrate of the liquid crystal cell is optically transparent for a lasing wavelength range of the device.

21 Claims, 8 Drawing Sheets

(51) Int. Cl.
| | | |
|---|---|---|
| *C09K 19/36* | (2006.01) | |
| *C09K 19/58* | (2006.01) | |
| *G02F 1/1343* | (2006.01) | |
| *G02F 1/137* | (2006.01) | |
| *H01S 3/094* | (2006.01) | |
| *H01S 3/16* | (2006.01) | |

(52) U.S. Cl.
CPC .... *G02F 1/13718* (2013.01); *G02F 1/134309* (2013.01); *H01S 3/094* (2013.01); *H01S 3/1643* (2013.01); *H01S 3/1686* (2013.01); *G02F 2202/04* (2013.01)

(56) References Cited

U.S. PATENT DOCUMENTS

| | | | | |
|---|---|---|---|---|
| 5,116,528 | A * | 5/1992 | Mullen | C09K 19/544 |
| | | | | 252/299.01 |
| 6,141,367 | A * | 10/2000 | Fan | H01S 3/10 |
| | | | | 372/53 |
| 6,678,297 | B2 * | 1/2004 | Kopp | H01S 3/20 |
| | | | | 257/40 |
| 8,964,161 | B2 | 2/2015 | Chien et al. | |
| 2005/0002101 | A1 | 1/2005 | Kim et al. | |
| 2011/0253909 | A1 * | 10/2011 | Himmelhaus | G01N 21/645 |
| | | | | 250/492.1 |
| 2016/0033806 | A1 | 2/2016 | Lavrentovich et al. | |
| 2016/0252755 | A1 | 9/2016 | Lavrentovich et al. | |

OTHER PUBLICATIONS

International Search Report dated Feb. 1, 2017 for International application No. PCT/US2016/062011.
Written Opinion dated Feb. 1, 2017 for International application No. PCT/US2016/062011.
Mandle, Richard J. et al., "Apolar Bimesogens and the Incidence of the Twist-Bend Nematic Phase Chemistry"—A European Journal, Apr. 2015, vol. 21, pp. 1-11.
Xiang, et al., "Electrically Tunable Selective Reflection of Light from Ultraviolet to Visible and Infrared by Heliconical Cholesterics,"Advanced Materials, vol. 27, pp. 3014-3018 (2015).
Xiang, et al., "Electrooptic Response of Chiral Nematic Liquid Crystals with Oblique Helicoidal Director," Physical Review Letters, PRL 112, pp. 217801-1-217801-5 (2014).
Meyer, Robert B., "Effects of Electric and Magnetic Fields on the Structure of Cholesteric Liquid Crystals," Applied Physics Letters, vol. 12, No. 9, pp. 281-282 (1968).
Palto, Set al. Photonics of Liquid-Crystal Structures: A Review. Crystallography Reports, Mar. 2011, vol. 56, No. 4, pp. 622-649.
International Preliminary Report on Patentability dated May 22, 2018 for International application No. PCT/US2016/062011.
Chen, et al., "Chiral heliconical ground state of nanoscale pitch in a nematic liquid crystal of achiral molecular dimers," PNAS, vol. 110, No. 40, pp. 15931-15936 (2013).
Shribak, et al., "Techniques for fast and sensitive measurements of two-dimensional birefringence distributions," Applied Optics, vol. 42, No. 16, pp. 3009-3017 (2003).
Adlem, et al., "Chemically induced twist-bend nematic liquid crystals, liquid crystal dimers, and negative elastic constants," American Physical Society, Physical Review E88, pp. 022503-1-022503-8 (2013).
Balachandran, et al., "Elastic properties of bimesogenic liquid crystals," Liquid Crystals, vol. 40, No. 5, pp. 681-688 (2013).
Borshch, et al., "Nematic twist-bend phase with nanoscale modulation of molecular orientation," Nature Communications, 4:2635, pp. 1-8 (2013).
De Gennes, "Calcul De La Distorsion D'une Structure Cholesterique Par Un Champ Magnetique," Solid State Communications, vol. 6, pp. 163-165 (1968).

* cited by examiner

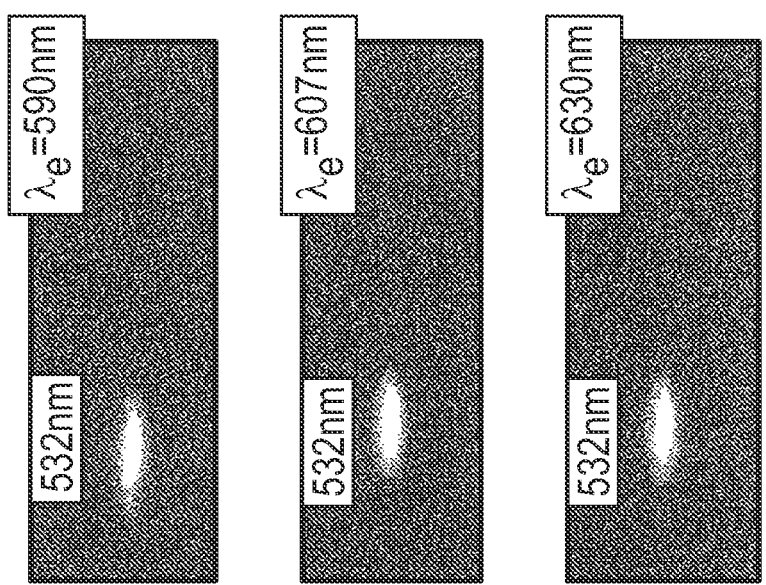
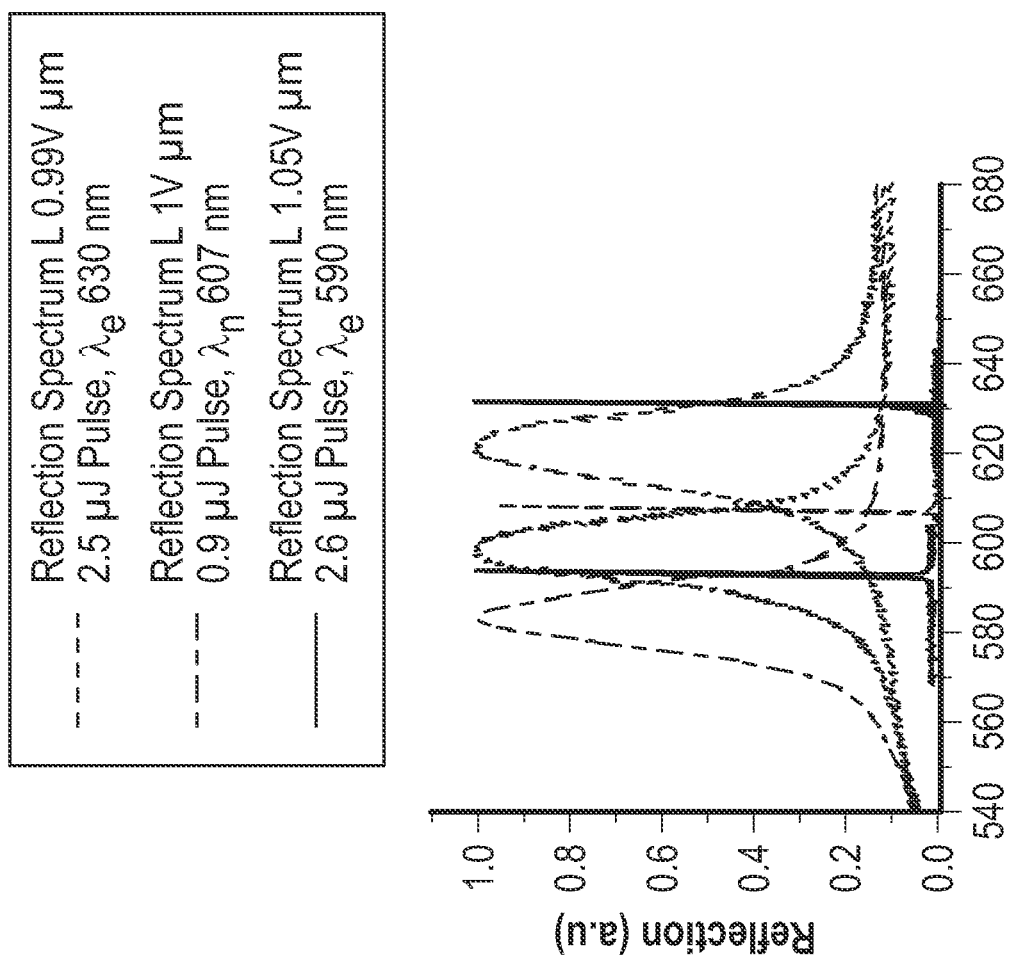
Fig. 6A
Fig. 6B

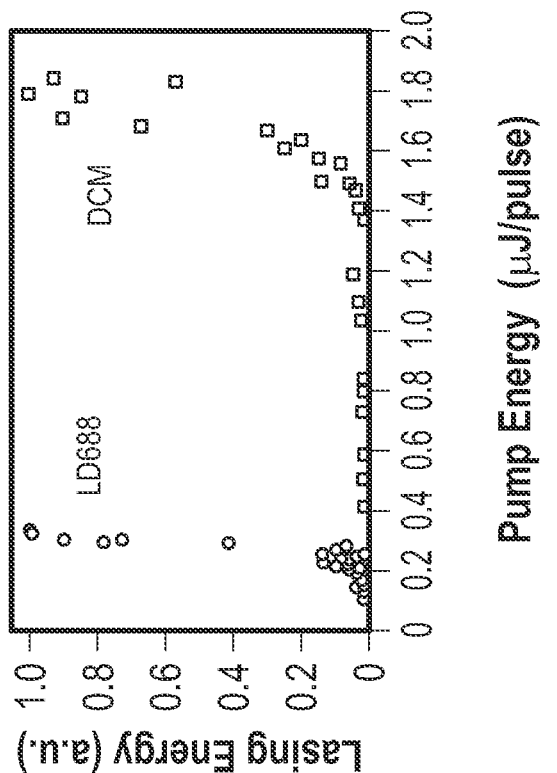
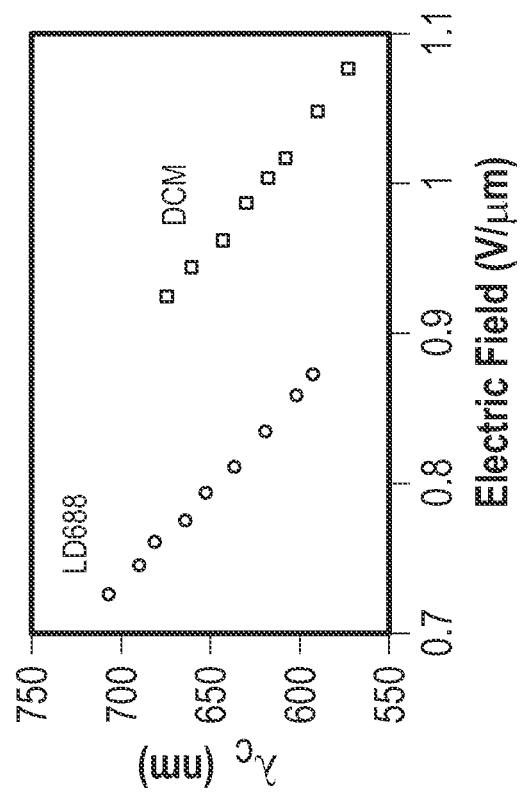
Fig. 7A
Fig. 7B

ELECTRICALLY TUNABLE LASER WITH CHOLESTERIC LIQUID CRYSTAL HELICONICAL STRUCTURE

This application is a national stage entry under 35 U.S.C. § 371 of International Application PCT/US2016/062011 filed Nov. 15, 2016 which claims the benefit of U.S. Provisional Application No. 62/255,735 filed Nov. 16, 2015 and titled "ELECTRICALLY TUNABLE LASER WITH CHOLESTERIC LIQUID CRYSTAL HELICONICAL STRUCTURE". U.S. Provisional Application No. 62/255,735 filed Nov. 16, 2015 and titled "ELECTRICALLY TUNABLE LASER WITH CHOLESTERIC LIQUID CRYSTAL HELICONICAL STRUCTURE" is hereby incorporated by reference in its entirety into the specification of this application.

This invention was made with Government support under grant/contract no. DMR-1410378 and DMR-1121288 awarded by the National Science Foundation. The Government of the United States has certain rights in this invention.

BACKGROUND

The following relates to the laser arts, optical device arts, liquid crystal device arts, and related arts.

BRIEF SUMMARY

Disclosed herein are electrically tunable lasing devices using a structure of cholesteric liquid crystal, representing an oblique helicoid. An electric field acting on the oblique helicoidal cholesteric changes the period of the structure and the conical angle but does not change the character of periodic modulation of the local refractive index. The tunable period of the structure leads to the electrically tunable wavelength of laser emission from the cholesteric slab in a broad spectral range, including (but not limited by) ultraviolet, visible and infrared. The broad wavelength tuning range of these liquid crystal (LC) lasers, coupled with compact size, narrow line widths, and high optical efficiency, makes these devices suitable for diverse applications such as laboratory-on-a-chip, medical treatment and diagnostics, dermatology, holography, and so forth. The disclosed lasing devices have advantages including, but not limited to, wide tuning range of the lasing wavelength, low driving voltage, compact size, ease of fabrication, low cost, and wide working temperature range. A given embodiment may achieve none, one, two, more, or all of these advantages and/or may achieve other advantages.

Disclosed herein are electrically tunable laser devices employing the so-called oblique helicoidal state of Ch, denoted here as $Ch_{OH}$. The $Ch_{OH}$ structure is formed in cholesterics with a small elastic constant of bend subject to the electric field. A suitable cholesteric may be formed by a mixture of dimeric molecules (representing two rigid rod-like units connected by a flexible chain) with chiral additives. We demonstrate that the lasing wavelength of the cholesteric heliconical structure varies in a very broad spectral range, as determined by the electric field applied across the sandwich type cell with transparent indium tin oxide (ITO) electrodes. The heliconical axis remains parallel to the applied electric field (and thus perpendicular to the plane of the cell). The electric field controls the pitch P and the conical angle θ of the structure, but does not change the sinusoidal distribution of the local refractive index, which means that the intensity of laser emission is not diminished by the director field distortions. There is no limitation to extend the lasing into different spectrum region, an appropriate laser dye and wavelength of the pumping laser is used. Light propagation in $Ch_{OH}$ is similar to that in right-angle helical cholesterics and chiral smectics of C type. It exhibits a photonic bandgap with a low-energy band edge at A and a high-energy edge at $\lambda_h$, determined by the pitch and effective refractive indices of the structure for differently polarized electromagnetic waves. Photon emission by excited atoms and molecules and distributed feedback lasing is expected at the band edges.

BRIEF DESCRIPTION OF THE DRAWINGS

FIG. 6 shows electrically tunable lasing with $Ch_{OH}$ structure in mixture DCM: (a) Typical lasing lines and associated reflection spectra, and (b) corresponding pumping and lasing patterns.

FIG. 7 shows electrically tunable lasing range and lasing threshold: (a) electrically tunable lasing range in sample LD688 and sample DCM; (b) lasing threshold for sample LD688 (measured at $\lambda_e$=625 nm), and for sample DCM (measured at $\lambda_e$=610 nm).

DETAILED DESCRIPTION

Figure 1:
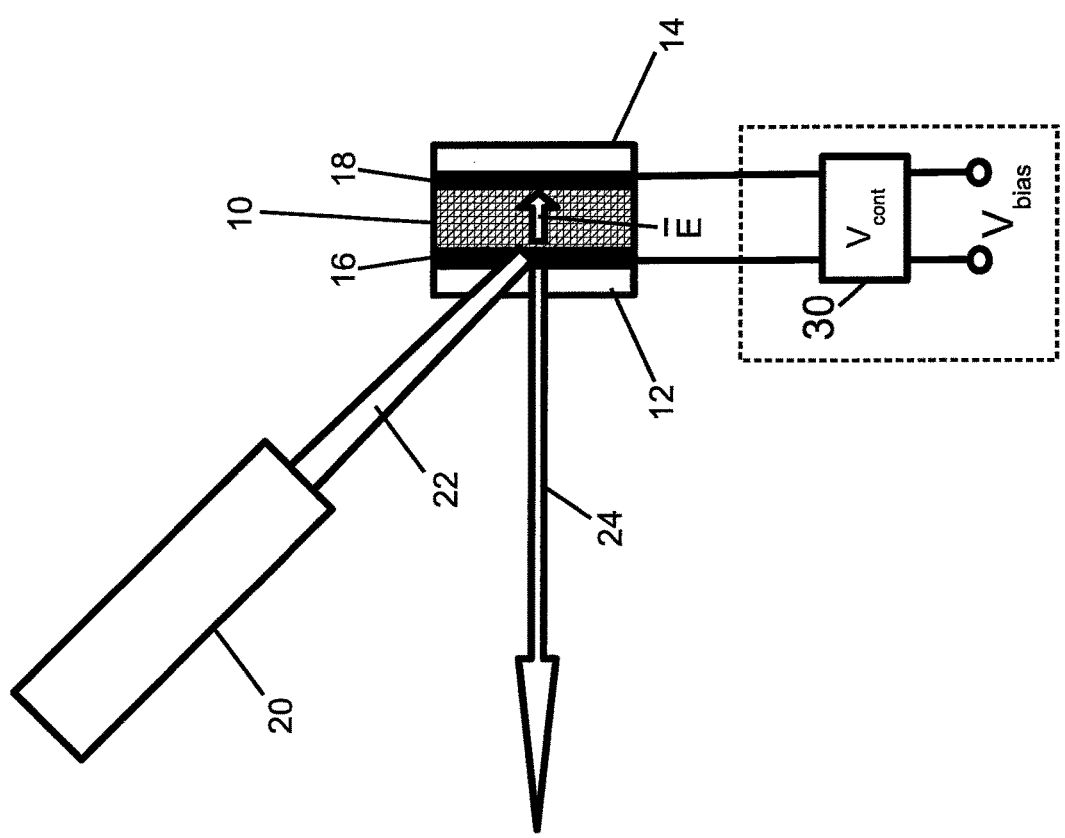
FIG. 1 illustrates an electrically tunable laser.

In a typical embodiment (FIG. 1), the liquid crystal (LC) material with oblique helicoidal ($Ch_{OH}$) structure 10 is disposed in a LC cell defined by two light-transmissive LC cell substrates 12, 14 coated on their facing surfaces by electrodes 16, 18. A pump laser 20 of a suitable wavelength, such as a Nd:YAG laser, generates a pump beam 22 that excites the laser to generate lasing light 24. The oblique helicoidal ($Ch_{OH}$) structure 10 is electrically adjusted or tuned by a voltage controller ($V_{cont}$) 30 powered by a biasing voltage ($V_{bias}$) 32 producing an electric field $\vec{E}$ as indicated in FIG. 1. In FIG. 1 the left electrode 16 is indium-tin-oxide (ITO) which is light transmissive while the right electrode 18 is an opaque electrode (e.g. a stack including silver or aluminum of thickness providing opacity), and the lasing light 24 is emitted only to the left.

Figure 2:
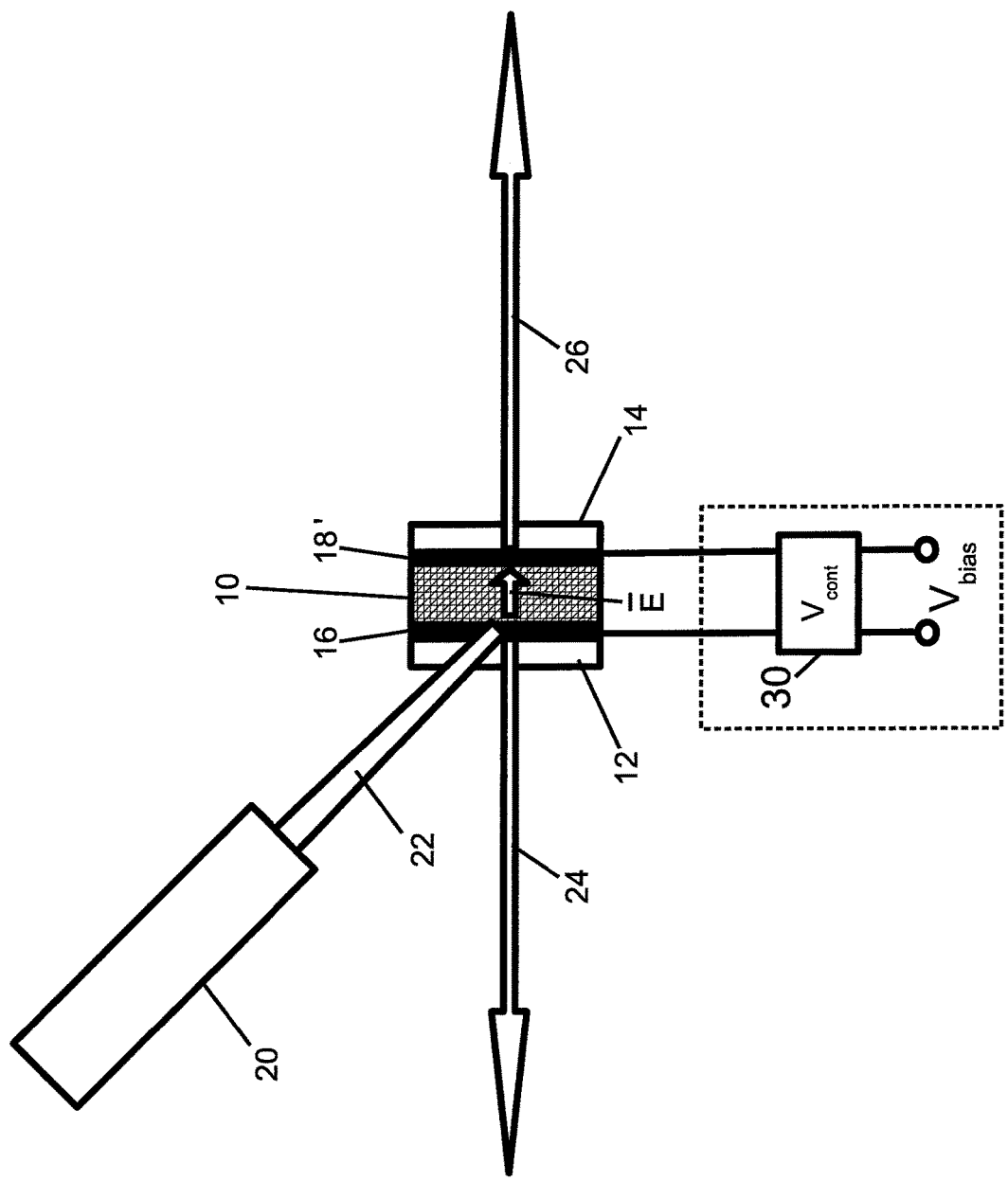
FIG. 2 illustrates an electrically tunable laser.

Alternatively, as shown in FIG. 2 if both electrodes 16, 18' are light transmissive (e.g., both ITO in FIG. 2), then lasing light 24, 26 may be emitted from both substrates. Some illustrative materials for forming the $Ch_{OH}$ material 10 are provided elsewhere herein. To provide lasing action, the $Ch_{OH}$ layer 10 includes a laser dye. For example, two suitable laser dyes include one of (or a combination of) DCM and/or LD 688 (both available from Exciton, Dayton, Ohio). As further described elsewhere herein, the $Ch_{OH}$ state is obtained for a range of biases applied by the biasing control $V_{cont}$ 30, and the laser dye is chosen to comport with the desired operational wavelength range.

Further details on the illustrative embodiments, along with further disclosure of illustrative embodiments of the $Ch_{OH}$ layer and experimental results for actually fabricated photonic devices providing lasing, are disclosed in the following.

Cholesteric liquid crystals represent a well-known example of one-dimensionally periodic photonic crystal. Because of chiral interactions, local orientation of the molecules (the so-called director n) rotates in space around a single axis, remaining perpendicular to this axis. The resulting structure is that of a right-angle helicoid, either left-handed or right-handed, depending on the molecular composition. By changing chemical composition (and sometimes temperature), the pitch p of the helicoid can be tuned in a very broad range, between approximately 100 nm and infinity. This tunability, covering the optically relevant length-scales, makes the cholesterics very attractive for photonic applications, in particular, lasing. Helical structure gives rise to Bragg reflection of circularly polarized light with the same handedness as the Ch. The reflection band is located between the wavelengths $\lambda_o = pn_o$ and $\lambda_e = pn_e$, where $n_o$ and $n_e$ are the ordinary and extraordinary refractive indices of the local uniaxial structure, respectively. When the cholesteric is doped with fluorescent molecules or quantum dots, lasing is observed at these edges, since there the photon group velocity approaches zero and the correspondingly long dwell time of the emitted photons supports simulated emission. Tunability of the emission wavelength, which represent the major attractive feature of Ch lasers, can be achieved in a variety of ways, for example, by (i) changing the temperature or concentration of chiral dopants; (ii) creating Ch samples with a variable pitch, fixed in space by polymerization, (iii) mechanically deforming polymerized structures; (iv) photochemical reactions. The most desired mode of tunability, by an electric field, although possible in principle, has not yet achieved its full potential due to the peculiar character of the dielectric response of the Ch. The low-frequency dielectric permittivity of Ch is anisotropic, equal to $\varepsilon_\parallel$ when measured along the local director and $\varepsilon_\perp$ when measured in an orthogonal direction. Usually, $\varepsilon_\parallel > \varepsilon_\perp$. When the electric field is applied parallel to the helicoidal axis, the axis realigns to be perpendicular to the field. If the field is applied perpendicularly to the axis, it expands the regions where n̂ is parallel to the field. Although the pitch might increase, the original sinusoidal single-harmonic helicoidal structure gets distorted, acquiring higher harmonics. The electric field transforms the sinusoidal modulation of the refractive index towards a rectangular one, thus strongly lowering the emission intensity of the principal bandgap and creating an additional reflection band at double frequency. An ideal Ch electrically-tunable laser would be the one in which the electric field modifies only the pitch, but preserves the sinusoidal single-harmonic structure. Such a laser is disclosed herein, based on the so-called oblique helicoidal state of Ch, or $Ch_{OH}$.

The $Ch_{OH}$ structure is formed in cholesterics with a very small elastic constant of bend subject to the electric field, as foreseen theoretically by Meyer (Meyer et al., "Effects of electric and magnetic fields on the structure of cholesteric liquid crystals", Applied Physics Letters, vol. 12 pp. 281-282 (1968)) and de Gennes and observed in Raman-Nath diffraction (Xiang et al., "Electrooptic Response of Chiral Nematic Liquid Crystals with Oblique Helicoidal Director", Phys Rev Lett, vol. 112 217801 (2014)) and Bragg reflection experiments (Xiang et al., "Electrically Tunable Selective Reflection of Light from Ultraviolet to Visible and Infrared by Heliconical Cholesterics", Adv Mater, vol. 27 pp. 3014-3018 (2015)). The suitable cholesteric is formed by a mixture of dimeric molecules (representing two rigid rod-like units connected by a flexible chain) with chiral additives. It is demonstrated here that the lasing wavelength of the cholesteric heliconical structure varies in a very broad spectral range, as determined by the electric field applied across the sandwich type cell with transparent indium tin oxide (ITO) electrodes. The heliconical axis remains parallel to the applied electric field (and thus perpendicular to the plane of the cell). The electric field controls the pitch P and the conical angle θ of the structure, but does not change the sinusoidal distribution of the local refractive index, which means that the intensity of laser emission is not diminished by the director field distortions. There is no limitation to extending the lasing into different spectrum region, if one uses the right laser dye and wavelength of the pumping laser.

Figure 3:
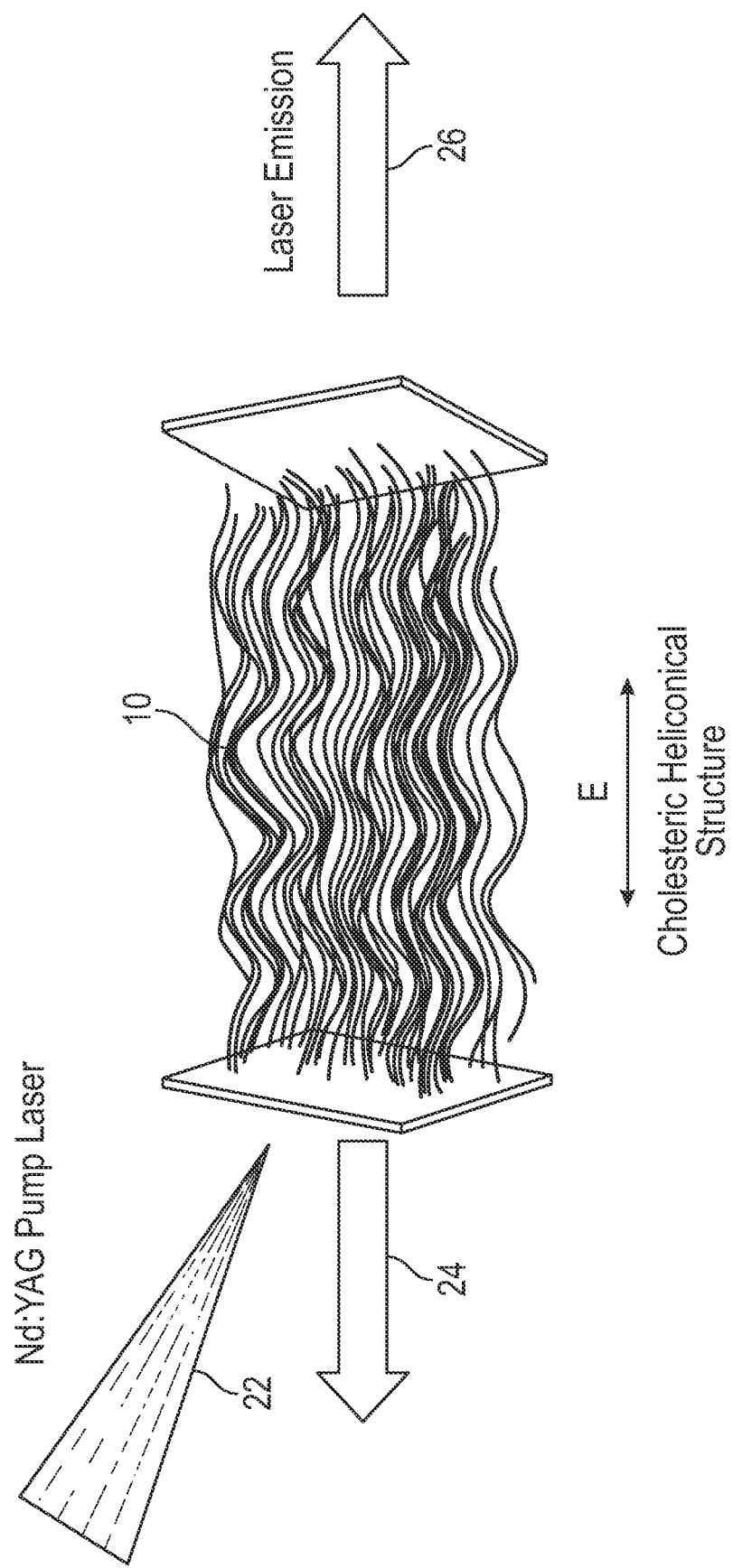
FIG. 3 illustrates cholesteric liquid crystal with oblique helicoidal structure in an electric field $\vec{E}$.

FIG. 3 illustrates the cholesteric liquid crystal with oblique helicoidal structure 10 in an electric field Ē. Lasing emission 24, 26 is output along the axial direction parallel to the applied electric field. Light propagation in $Ch_{OH}$ is similar to that in right-angle helical cholesterics and chiral smectics of C type. It shows a photonic bandgap with the low-energy band edge at A and the high-energy edge at $\lambda_h$, determined by the pitch and effective refractive indices of the structure 10 for differently polarized electromagnetic waves. Photon emission by excited atoms and molecules and distributed feedback lasing 24, 26 is expected at the band edges.

The oblique helicoidal structure of $Ch_{OH}$ is stabilized in the externally applied electric field when the material shows a small elastic constant of bend deformations $K_3$, namely, $$K_3 < \frac{4}{\pi^2} K_2,$$

where $K_2$ is the twist elastic constant. We obtained a cholesteric material with the required limitation of the bend elastic constant $K_3$ fulfilled within a broad temperature range (including the room temperature) by mixing two dimeric LCs (1', 7'-bis(4-cyanobiphenyl-4'-yl)heptane (CB7CB) and 1-(4-cyanobiphenyl-4'-yl)-6-(4-cyanobiphenyl-4'-yloxy) hexane (CB9CB)), and a standard LC pentylcyanobiphenyle (5CB) (Merck). The mixtures were doped with a left handed chiral additive S811 (Merck) that determines P, and also laser dye DCM and LD688 (Exciton) to cause the lasing effect. These two laser dyes exhibited high photoluminescence efficiency. Furthermore, these dyes were well soluble in the liquid crystals used. Two mixtures were used, with composition CB7CB:CB9CB:5CB:S811:DCM (in weight units) being 30:20:46:4:0.3 (mixture DCM, cholesteric phase in the range (21-64) ° C.); CB7CB:CB9CB:5CB: S811:LD688 being 30.1:20:45.9:4:0.6 (mixture LD688, 29.5-62.8° C.). The whole mixtures were thoroughly mixed before they were capillary-filled into the homogeneous LC cells in an isotropic state. The thickness of all the LC cells was 50±2 μm. All data reported here were obtained at 25° C. for mixture DCM, and at 32.5° C. for mixture LD688.

Figure 4:
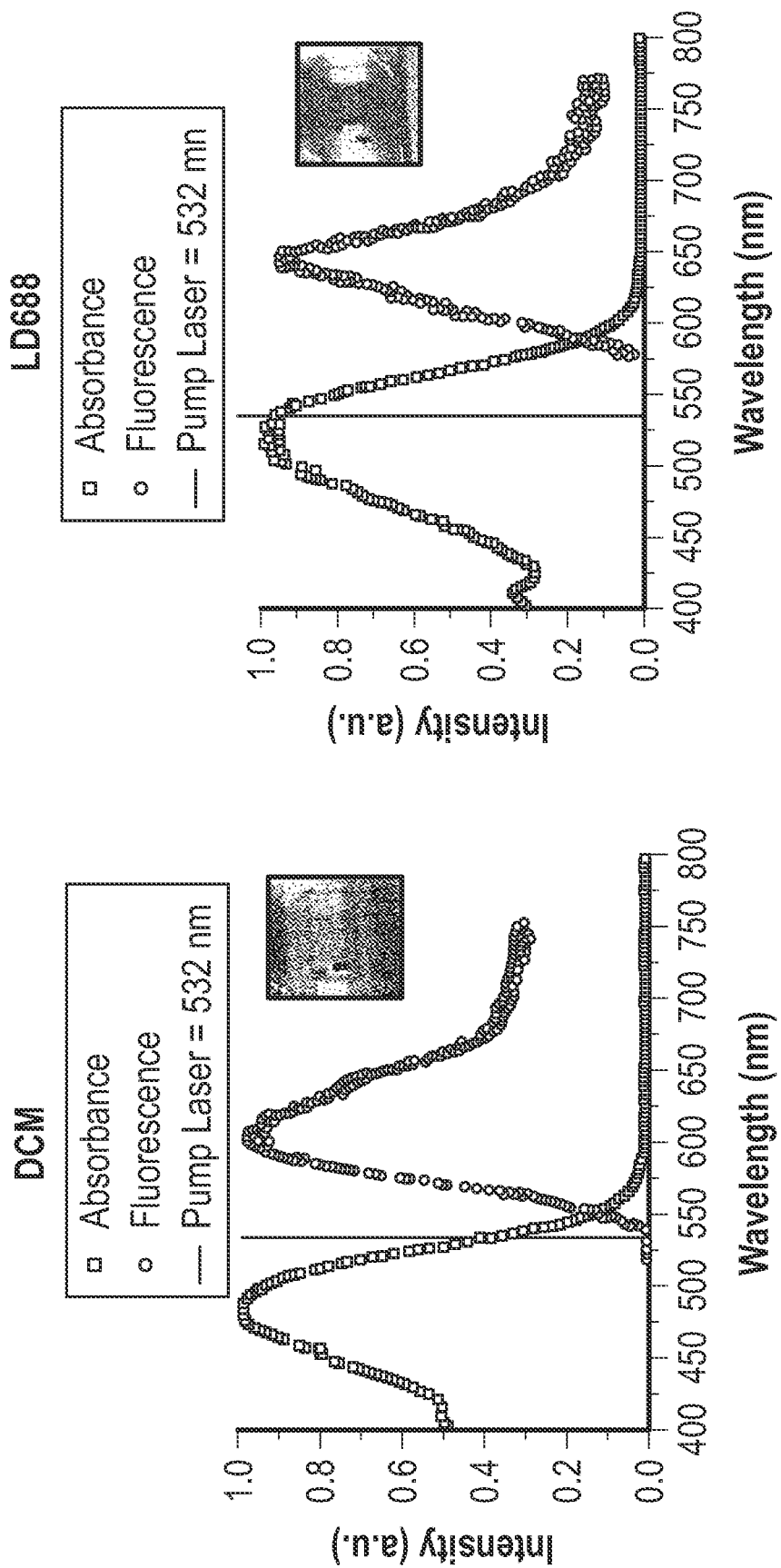
FIG. 4 shows absorbance and fluorescence spectra in cholesteric mixture for DCM (left plot), and LD688 (right plot). The insets show the photographs of real samples.
Figure 5A:
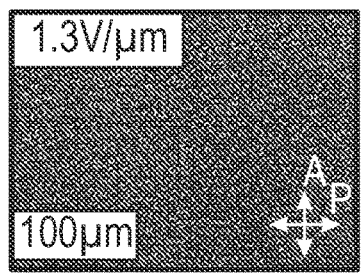
FIG. 5 shows electric field induced cholesteric oblique helicoidal structure in cholesteric mixture DCM. Polarizing optical microscope textures of field induced oblique helicoidal states are shown with reflected (a) blue, (b) green, (c) orange, (d) red colours, (e) IR-reflective states; and (f) fingerprint state. The bottom plot (g) shows reflection spectra of the oblique helicoidal states at different applied electric field. The root mean square (RMS) amplitude of the electric field is indicated on the figures.
Figure 5B:
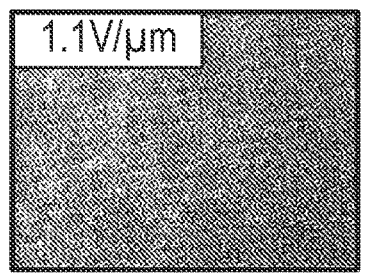
Figure 5C:
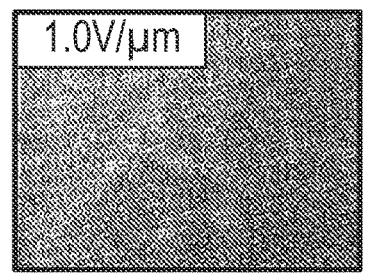
Figure 5D:
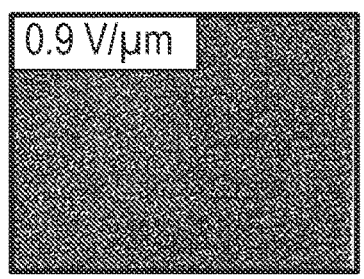
Figure 5E:
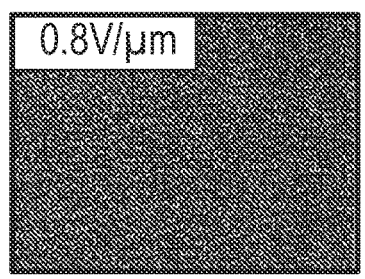
Figure 5F:
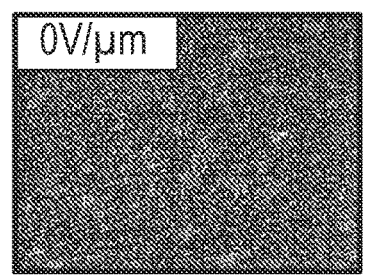
Figure 5G:
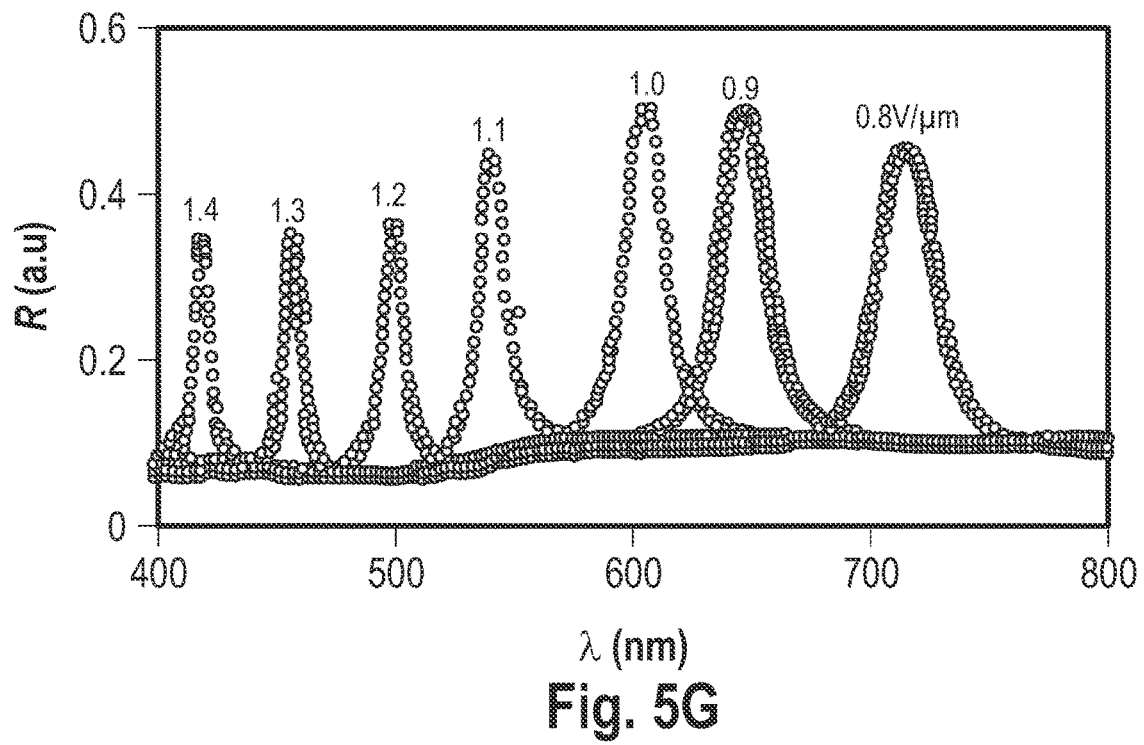

Before the performance of the lasing-associated experiments, the fluorescence emission and absorption spectra of the mixtures were measured. The experimental results are shown in FIG. 4, which shows absorbance and fluorescence spectra in cholesteric mixture for DCM (left plot), and LD688 (right plot). The insets in FIG. 4 show the photographs of real samples. For the mixture DCM, the absorption peak is around 460 nm, and the fluorescence peak is around 600 nm. For the mixture LD688, the absorption peak is around 525 nm, and the fluorescence peak is around 650 nm.

FIG. 5 shows electric field induced cholesteric oblique helicoidal structure in cholesteric mixture DCM. Polarizing optical microscope textures of field induced oblique helicoidal states are shown with reflected (a) blue, (b) green, (c) orange, (d) red colours, (e) IR-reflective states; and (f) fingerprint state. The bottom plot (g) shows reflection spectra of the oblique helicoidal states at different applied electric field. The root mean square (RMS) amplitude of the electric field is indicated on the figures. More particularly, in the experiments, the cholesteric was sandwiched between two glass plates with transparent indium tin oxide (ITO) electrodes. When a sufficiently strong electric field is applied, the material is switched into a uniform nematic with the director parallel to the field. When the field is decreased, the LC showed a sequence of changing wavelength of reflection, from ultraviolet (UV) to visible blue, then green, orange, red, and, finally, near infrared (near IR), as seen in FIG. 5a-e. Below 0.7 V/μm, the LC transforms into the light scattering texture shown in FIG. 5f. FIG. 5g presents reflection spectra of reflection at various field strengths that further demonstrate a very broad range of controlled reflectance, from UV to IR, covering the entire range of visible light. As the field decreases, the peak wavelength shifts to IR.

The samples were pumped with pulses at a wavelength of 532 nm from a Nd:YAG laser (Quantel YG682S-100). The pulse width and the repetition frequency were 7.5 ns and 2 Hz, respectively. The pump beam, with a 100 μm waist, was focused on the oblique helicoidal cholesteric sample at an oblique incidence (about 45°). The output laser emission in the forward direction of the sample was collected by a high resolution spectrometer TRIAX 550 (Jobin Yvon Inc, USA).

FIG. 6 shows electrically tunable lasing with $Ch_{OH}$ structure in mixture DCM: (a) Typical lasing lines and associated reflection spectra, and (b) corresponding pumping and lasing patterns. Under the pumped pulses, a sharp lasing peak emerged at the photonic bandgap edge. The lasing peak wavelength depends on the location of the phonic bandgap of the cholesteric heliconical structure, as seen in FIG. 6a. For example, under the electric field of 0.99V/μm, the photonic bandgap is centered at 622 nm, and the lasing peak wavelength $\lambda_e$ is at 630 nm, with a full-width at half-maximum of 0.3 nm. When the electric field increases, the reflection photonic bandgap moves toward shorter wavelength, and the lasing peak also moves toward to shorter wavelength, as further seen in FIG. 6a. Typical lasing lines and corresponding pumping and lasing patterns are shown in FIGS. 6a and 6b.

FIG. 7 shows electrically tunable lasing range and lasing threshold: (a) electrically tunable lasing range in sample LD688 and sample DCM; (b) lasing threshold for sample LD688 (measured at $\lambda_e$=625 nm), and for sample DCM (measured at $\lambda_e$=610 nm). More particularly, FIG. 7a summarizes the electrically controlled tunable lasing on samples with dye LD688 and DCM, respectively. The lasing wavelength $\lambda_e$ can be tuned from 594 nm to 722 nm for LD688; and from 574 nm to 675 nm for DCM. The tunable lasing range is limited by the fluorescent spectrum of the laser dye. In principle, there is no limitation to extending the lasing into different spectrum region, if one uses the right laser dye and wavelength of the pumping laser. FIG. 7b presents the lasing intensity at the different pump energies, which implies the lasing threshold $E_{th}$=0.25 μJ/pulse for sample LD688 at the lasing wavelength 625 nm, and $E_{th}$=1.6 μJ/pulse for sample DCM at the lasing wavelength 610 nm. Above the threshold, unstable lasing peaks can appear at the high-energy band edge or in the middle of the energy band. The laser emission is left-circularly polarized, which indicates optical feedback through internal Bragg reflection.

Figure 8A:
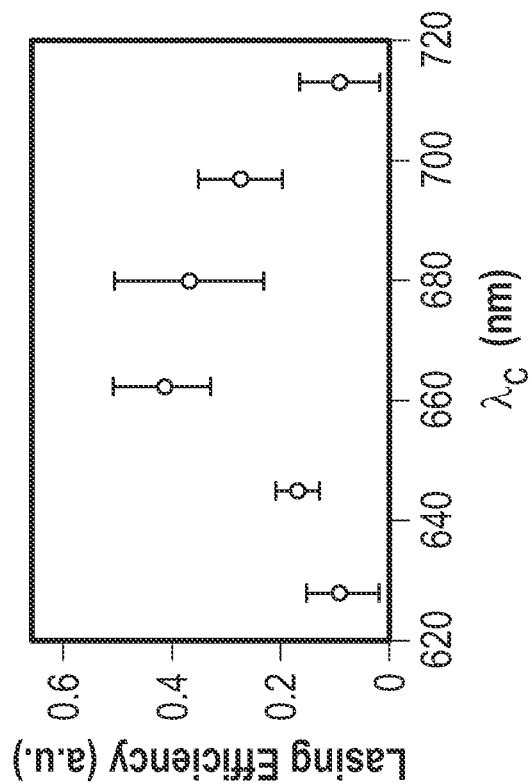
FIG. 8 shows lasing efficiency of sample LD688: (a) emission energy at different lasing wavelengths; and (b) lasing efficiency at different lasing wavelengths.
Figure 8B:
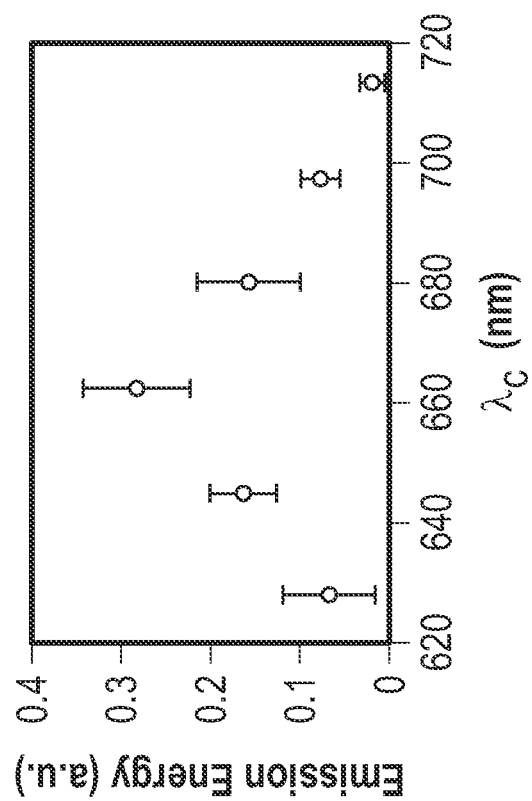

FIG. 8 shows lasing efficiency of sample LD688: (a) emission energy at different lasing wavelengths; and (b) lasing efficiency at different lasing wavelengths. More particularly, to investigate the electrically tunable lasing efficiency, the emission energy was measured at different lasing wavelength with a fixed pumping energy $U_p$=8.6±0.6 0/pulse, as shown in FIG. 8a. The lasing efficiency η is defined as η=$I_e/I_f$, where $I_e$ is the emission energy, and $I_f$ is the fluorescent intensity at the corresponding wavelength. The emission energy and lasing efficiency preserve their order of magnitude when the lasing wavelength changes in a broad spectral range, from about 630 nm to 715 nm, as seen in FIG. 8b. This feature demonstrate another advantage of oblique helicoidal structure over regular cholesteric lasers.

To conclude, we describe an electrically tunable laser in a wide spectrum range by the heliconical cholesteric state that exist at room temperature. The tunable lasing is achieved in a sandwich geometry, in which the cholesteric is confined between two plates with transparent electrodes, thus implying a low cost and easy fabrication process. The broad wavelength tuning range of LC lasers, coupled with their microscopic size, narrow line widths, and high optical efficiencies as compared with more conventional solid-state lasers, is expected to facilitate new applications in areas such as labs-on-a-chip, medical diagnostics, dermatology, holography, or so forth.

The main component of the explored mixtures that yields the necessary smallness of $K_3$ is CB7CB. It shows a uniaxial N phase in the range 103-116° C. between the isotropic and the twist-bend nematic phase $N_{tb}$. At the field frequency 10 kHz, the dielectric permittivities parallel and perpendicular to the director were measured to be $\varepsilon_\parallel$=7.3 and $\varepsilon_\perp$=5.9, respectively. The dielectric anisotropy of the material is thus positive, so that the director prefers to align parallel to the electric field. At 106° C., the elastic constants are $K_1$=5.7 pN, $K_2$=2.6 pN, and $K_3$=0.3 pN, while the refractive indices are measured in the laboratory by the wedge cell technique to be $n_e$=1.73±0.01 and $n_o$=1.58±0.01 (at A=632 nm). CB9CB is also of positive dielectric anisotropy; it shows a uniaxial N phase in the range 105-121° C.

The temperature was controlled by a hot stage LTS350 with a controller TMS94 (both Linkam Instruments) with 0.01° C. accuracy. All cells in the experiments were addressed with the AC electric field of frequency 3 kHz (square wave). Flat cells were formed by glass plates with transparent ITO electrodes and alignment polyimide PI-1211 (Nissan); the thickness of cholesteric layers was d=50±2 μm. Selective light reflection was characterized by two complementary approaches. First, the field-induced color changes were visualized under the polarizing microscope (Optiphot2-pol, Nikon) with two crossed linear polarizers, in the reflection mode, as shown in FIG. 4. Second, the reflection spectra were measured of the cholesteric heliconical structure using Ocean Optics spectrometers USB2000.

The tunable lasing from the cholesteric heliconical samples was measured after the excitation of the pumped laser beam. A second harmonic-generated pumped laser beam from a Q-switch Nd:YAG laser (Quante) YG682S-100), with a wavelength, pulse width, and pulse repetition frequency of 532 nm, 7.5 ns, and 2 Hz, respectively, was used to pump the cholesteric heliconical sample. The incident beam was focused on the sample by a focus tunable lens at an incident angle of 45° from the normal of the cell. The lasing emission along the normal direction of the cell was measured by using a fiber based spectrometer with an optical resolution of 0.1 nm (TRIAX 550, Jobin Yvon Inc, USA). A half-wave plate (for λ=532 nm) and a polarizer were placed behind the exit of the pump laser to adjust the incident pumping energy of the pumping laser beam on the cells. The absorbance and fluorescent spectrum were measured using a fiber spectrometer USB4000 (Ocean Optics).

It is noted that in addition to the particular dimeric liquid crystal (LC) materials used in the examples (CB7CB and CB9CB), other dimeric LC materials are contemplated. Typically, one dimeric LC may be sufficient to obtain the $Ch_{OH}$ state under appropriate electrical bias, while a mixture of two or more dimeric LCs can more effectively promote formation of the $Ch_{OH}$ state under appropriate electrical bias. A mixture of dimeric LC materials can be particularly useful for achieving the $Ch_{OH}$ state at or near room temperature.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An electrically tunable laser comprising:
an active layer comprising a mixture of a cholesteric liquid crystal material having an elastic constant of bend deformation effective for the cholesteric liquid crystal material to be biased into an oblique helicoidal ($Ch_{OH}$) state, and a fluorescent laser dye providing lasing action, wherein the cholesteric liquid crystal material includes a mixture of at least two different dimeric liquid crystal materials;
a liquid crystal cell including spaced apart substrates defining a cell gap in which the active layer is disposed, the substrates including electrodes arranged to bias the active layer into the oblique helicoidal ($Ch_{OH}$) state, wherein at least one substrate of the liquid crystal cell is optically transparent for a lasing wavelength range of the device; and
a pump laser arranged to optically pump lasing in the active layer.

2. The electrically tunable laser of claim 1 wherein the mixture of at least two different dimeric liquid crystal materials includes a mixture of dimeric CB7CB and dimeric CB9CB.

3. The electrically tunable laser of claim 2 wherein the cholesteric liquid crystal material further includes a chiral additive.

4. The electrically tunable laser of claim 2 wherein the cholesteric liquid crystal material further includes liquid crystal pentylcyanobiphenyl.

5. The electrically tunable laser of claim 1 further comprising:
a voltage controller configured to tune a wavelength of the lasing in the active layer by adjusting the bias of the active layer while continuing to bias the active layer into the oblique helicoidal ($Ch_{OH}$) state.

6. The electrically tunable laser of claim 1 wherein the pump laser is a Nd:YAG laser.

7. The electrically tunable laser of claim 1 wherein the cholesteric liquid crystal material further includes a chiral additive.

8. The electrically tunable laser of claim 1 wherein the fluorescent laser dye includes a DCM laser dye.

9. The electrically tunable laser of claim 1 wherein the fluorescent laser dye includes an LD688 laser dye.

10. The electrically tunable laser of claim 1 wherein the cholesteric liquid crystal material of the active layer has an elastic constant of bend deformation $K_3$ that is less than $\frac{4}{\pi^2} K_2$ where $K_2$ is the twist elastic constant of the cholesteric liquid crystal material.

11. The electrically tunable laser of claim 1 wherein the cholesteric liquid crystal material of the active layer has a positive dielectric constant and an elastic constant of bend deformation sufficiently small for the cholesteric liquid crystal material to be biased into an oblique helicoidal ($Ch_{OH}$) state.

12. A method comprising:
electrically biasing an active layer comprising a mixture of a cholesteric liquid crystal material and a laser dye to place the active layer into an oblique helicoidal ($Ch_{OH}$) state, wherein the cholesteric liquid crystal material includes a mixture of at least two different dimeric liquid crystal materials; and
pumping the active layer in the $Ch_{OH}$ state to produce lasing.

13. The method of claim 12 wherein the mixture of at least two different dimeric liquid crystal materials includes a mixture of dimeric CB7CB and dimeric CB9CB.

14. The method of claim 13 wherein the cholesteric liquid crystal material further includes a chiral additive.

15. The method of claim 14 wherein the chiral additive is S811.

16. The method of claim 13 wherein the cholesteric liquid crystal material further includes liquid crystal pentylcyanobiphenyl.

17. The method of claim 12 wherein the pumping comprises optical pumping.

18. The method of claim 12 wherein the cholesteric liquid crystal material further includes a chiral additive.

19. The method of claim 12 wherein the laser dye includes a DCM laser dye.

20. The method of claim 12 wherein the laser dye includes an LD688 laser dye.

21. The method of claim 12 further comprising:
adjusting a wavelength of the produced lasing by adjusting the electrical biasing while continuing to place the active layer into the oblique helicoidal ($Ch_{OH}$) state.

* * * * *